(12) United States Patent
Portmann

(10) Patent No.: US 7,264,204 B1
(45) Date of Patent: Sep. 4, 2007

(54) UNMANNED AERIAL VEHICLE CATCHER

(75) Inventor: Helmut Portmann, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 9 days.

(21) Appl. No.: 11/311,582

(22) Filed: Dec. 12, 2005

(51) Int. Cl.
*B64F 1/02* (2006.01)

(52) U.S. Cl. .............................. 244/110 C; 244/110 F

(58) Field of Classification Search ............ 244/110 C, 244/110 F, 110 G, 114 R; 89/1.11; 446/30, 446/31
See application file for complete search history.

(56) References Cited

U.S. PATENT DOCUMENTS

| | | | | |
|---|---|---|---|---|
| 3,980,259 A | * | 9/1976 | Greenhalgh et al. | 244/139 |
| 4,311,290 A | * | 1/1982 | Koper | 244/110 R |
| 4,753,400 A | * | 6/1988 | Reuter et al. | 244/110 R |
| 5,039,034 A | * | 8/1991 | Burgess et al. | 244/110 F |
| 6,264,140 B1 | * | 7/2001 | McGeer et al. | 244/110 F |
| 7,097,137 B2 | * | 8/2006 | McDonnell | 244/110 C |

* cited by examiner

*Primary Examiner*—Michael J. Carone
*Assistant Examiner*—Benjamin P. Lee
(74) *Attorney, Agent, or Firm*—James T. Shepherd

(57) ABSTRACT

Launch and recovery of an aerial vehicle by a forwardly moving surface vehicle relies on a winch module having a winch to selectively reel out and reel in a towline and a sensor capable of sensing tension in the towline. A lifting body assembly having a pair of lifting bodies and a snagging wire is connected to the towline. The lifting bodies lift and laterally extend the snagging wire between the lifting bodies. An aerial vehicle flying through the air engages the snagging wire by a hook. A first signal representative of tension of the towline causes the winch to reel in the towline and to bring the aerial vehicle to the surface vehicle, and a second sensor associated with the hook generates a second signal representative of tension in the hook and causes the aerial vehicle to cut its motor.

18 Claims, 11 Drawing Sheets

UNMANNED AERIAL VEHICLE CATCHER

STATEMENT OF GOVERNMENT INTEREST

The invention described herein was made in the performance of official duties by an employee of the Department of the Navy and may be manufactured, used, licensed by or for the Government for any governmental purpose without payment of any royalties thereon.

BACKGROUND OF THE INVENTION

This invention relates to a method of launching and recovering fixed wing unmanned aerial vehicles (UAVs) from unmanned surface vehicles (USVs). More particularly, this invention integrates proven aerodynamic designs and controllable tether mechanisms on unmanned platforms to launch and recover fixed wing aerial craft.

Currently, fixed wing UAVs are difficult to launch and recover from ships at sea. The most prominent past example was a system of the 1980s which the U.S. Navy designated Pioneer. The Pioneer UAV was launched from U.S. battleships with what was called rocket assisted take off (RATO) and recovered in a net mounted on the side of the ship. All the structure associated with RATO made it cumbersome, and the recovery via the net worked only for pusher-propeller UAVs. Consequently, even if fixed-wing UAVs could be launched from ships at sea, recovery would not be available for most types of fixed wing UAVs.

These limitations have resulted in predominant reliance on rotorcraft UAVs for maritime operations. However, this reliance on rotorcraft UAVs significantly limits operational capabilities and utility. In other words, the extended capabilities of many fixed wing UAVs currently can't be exploited since many existing UAV designs can't be dependably recovered at sea without requiring special configurations such as pusher propellers, or other extensive modifications.

Thus, a need has been recognized in the state of the art for an improved system and method for launching and recovering fixed wing UAVs using USVs to allow more widespread use of contempory UAV designs.

SUMMARY OF THE INVENTION

The present invention provides for a system and method for launch and recovery of an unmanned aerial vehicle by an unmanned surface vehicle. The surface vehicle has a landing pad for the aerial vehicle and generates a flowing stream of ambient air above it. A winch module on the surface vehicle has a winch connected to a towline to selectively reel out and reel in the towline. A sensor on the winch module is capable of sensing tension in the towline. A lifting body assembly is connected to the towline and has a pair of lifting bodies and a snagging line. The lifting bodies are adapted to raise and lift the lifting body assembly in the flowing stream of ambient air above the surface vehicle and to laterally extend the snagging wire between the lifting bodies. A motor driven aerial vehicle flies through the air and has a grabber hook mechanism having a pivoted boom supporting a hook to engage the snagging wire. Each lifting body includes an aerostat having fins to separate the lifting bodies in opposite lateral directions from each other and laterally extend the snagging wire between them. The sensor of tension coupled to the towline generates a first signal representative of tension of the towline as the grabber hook mechanism engages the snagging line. The first representative signal causes the winch to reel in the towline and to bring the aerial vehicle to the landing pad on the surface vehicle. A sensor of tension coupled to the grabber hook mechanism generates a second signal representative of tension in the grabber hook mechanism as the grabber hook mechanism engages the snagging line. The second representative signal causes the aerial vehicle to cut its motor and be towed by the towline like a glider. Pressure sensors in the landing pad and a limit switch on the winch module sense contact with the aerial vehicle to stop reeling in the towline.

An object of the present invention is to provide a system and method of launching and recovering fixed wing UAVs from USVs.

Another object of the invention is to provide a system and method for using fixed wing UAVs for launch and recovery by USVs without requiring modifications to the UAVS.

Another object of the invention is to provide an improved launch and recovery system for maritime use of fixed wing UAVs.

Another object is to provide improved launch and recovery of fixed wing UAVs from marine or land-based military or commercial platforms to improve operational capabilities.

Another object of the invention is to provide an improved launch and recovery system for maritime use of fixed wing UAVs using a USV capable of towing the UAV.

Another object of the invention is to provide an improved launch and recovery system for fixed wing UAVs using a free swiveling grabber hook mechanism on the UAV.

Another object of the invention is to provide an improved launch and recovery system that frees a host ship from having to restrict its operations and maneuvers for launch and recovery of UAVs.

These and other objects of the invention will become more readily apparent from the ensuing specification when taken in conjunction with the appended claims.

DESCRIPTION OF THE PREFERRED EMBODIMENT

Figure 1:
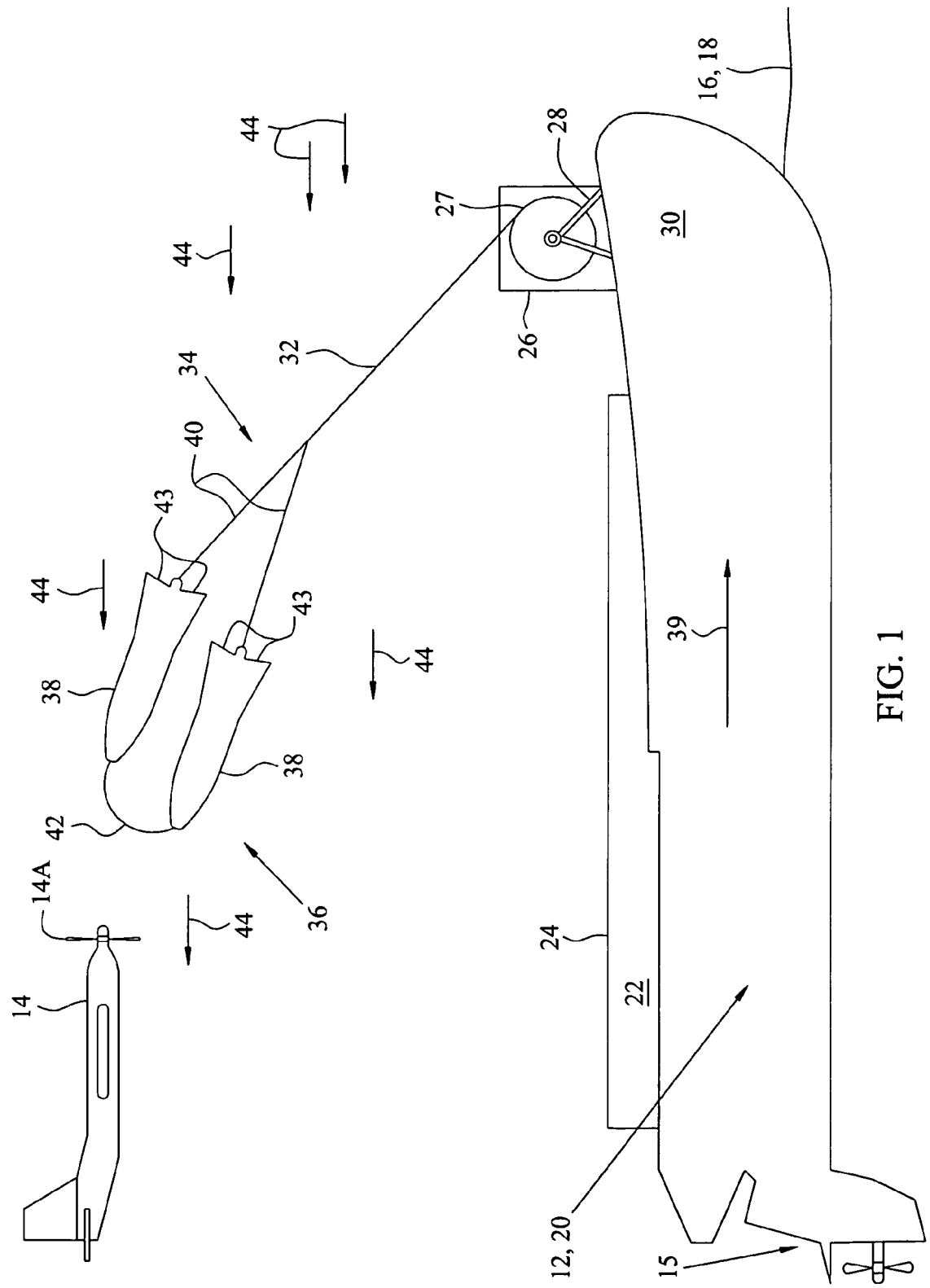
FIG. 1 shows a schematic side view of a USV fitted with a tow winch module in the bow reeling out a towline with two lifting bodies of a lifting body assembly attached at the end.
Figure 2:
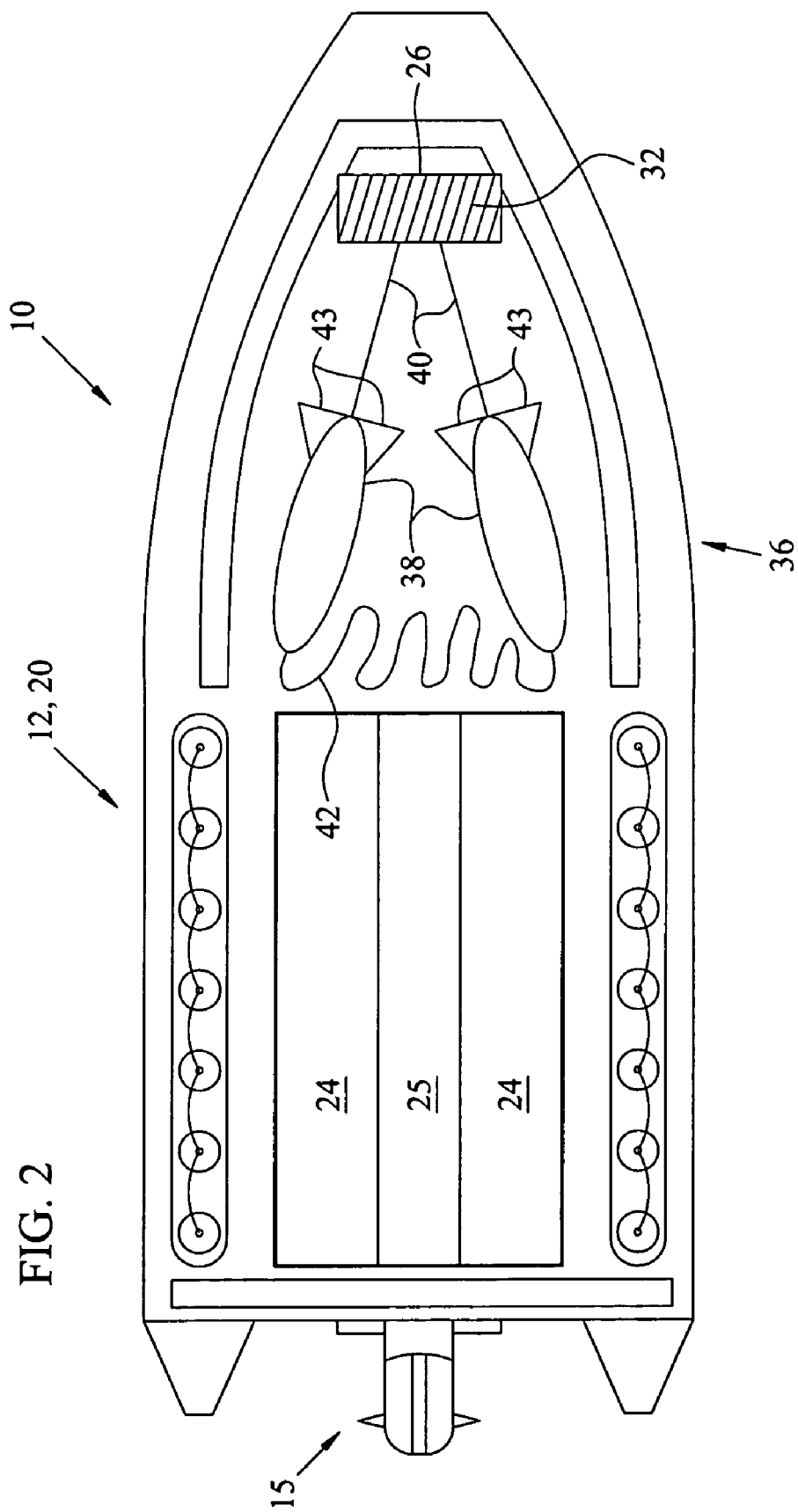
FIG. 2 shows a schematic plan view of the lifting bodies, branched tether, and snagging cable of the lifting body assembly stowed on deck of the USV prior to deployment

Referring to FIGS. 1 and 2, launch and recovery system 10 of the invention has an unmanned surface vehicle (USV) 12 to launch and recover a fixed wing unmanned aerial vehicle (UAV) 14. USV 12 has motor-driven propellers 15 or other means for propulsion, and can be a small boat-sized craft for travel on the surface 16 of a body of water 18. USV 12 can also be an ocean-going ship that is manned or unmanned and designed for military or commercial operations at rest or underway. USV 12 assures safe and reliable launch and recovery of fixed wing UAV 14 that can have one or more motor-driven propellers 14A conventionally located at the front as well as designs relying on pusher propellers.

USV 12 of system 10 has a buoyant hull 20 having a landing pad 22 for receiving UAV 14 on a launch pad surface 24 and launch pad channel 25. The flat landing pad surface 24 and rounded channel 25 are shaped to longitudinally cradle the bottom half of the fuselage and stopped propeller of UAV 14, also see FIG. 10.

A powered winch module 26 has a winch 27 mounted on winch support brackets 28 at bow 30 and is secured to and stows a towline 32 having its distal end 34 attached to a lifting body assembly 36. Towline 32 can be any of a wide variety of flexible load bearing members including cables and lines having sufficient strength and toughness to bear the loads created by lifting body assembly 36 and UAVs 14 during launch and recovery in expected winds and sea states.

Lift body assembly 36 has a pair of lifting bodies 38 each attached at one end to a branched tether 40 connected to distal end 34 of towline 32, and a snagging wire 42 connected between the lifting bodies 38. When launched from USV 12, lifting bodies 38 are separated a predetermined distance apart by the extended length of snagging wire 42, as shown in FIG. 1. Towline 32 is selectively reeled-out from or reeled-in to winch 27 to respectively deploy or retrieve lifting bodies 38 above hull 20 of USV 12. When towline 32 is reeled-in onto winch 27, part of tether 40 may also be wound onto winch 27 so that lifting bodies 38 of lift body assembly 36 lie adjacent one another on launch pad 22 with snagging cable 42 gathered in between, see FIG. 2.

Lifting bodies 38 can be small helium-filled aerostats (aerodynamically shaped balloons) having small vanes or fins 43 that are oriented to cause bodies 38 to separate in opposite lateral directions from one another. Snagging wire 42 connecting and extending between lifting bodies 38 maintains them at a predetermined distance of lateral separation due to the oppositely exerted aerodynamic forces created by reaction of fins 43 on each of lifting bodies 38 to the airstream of ambient air. The airstream is schematically shown as arrows 44, as it flows over lifting bodies 38 and fins 43.

Airstream 44 usually is created as USV 12 pulls flying lifting assembly 36 in the forward direction through water 18, as shown by arrow 39. However, the relative flow of airstream 44 can be forceful ambient wind so that launch and recovery system 10 may operate successfully with USV 12 at anchor from bow 30.

Lifting bodies 38 can also be a pair of small parafoils that have control surfaces that function like fins 43. The parafoils of lifting bodies 38 are appropriately positioned to provide lift and keep lifting bodies 38 separated by wire 42 and tether 40 as they are being towed behind USV 12. The technical feasibility of deploying and retrieving parafoil lifting bodies has been demonstrated in the prior art wherein tourism boats employ a similar technique to loft parafoils bearing a passenger to heights of up to 100 feet behind the boat. The forward motion of the boat provides a sufficient airstream for the necessary lift.

Figure 3:
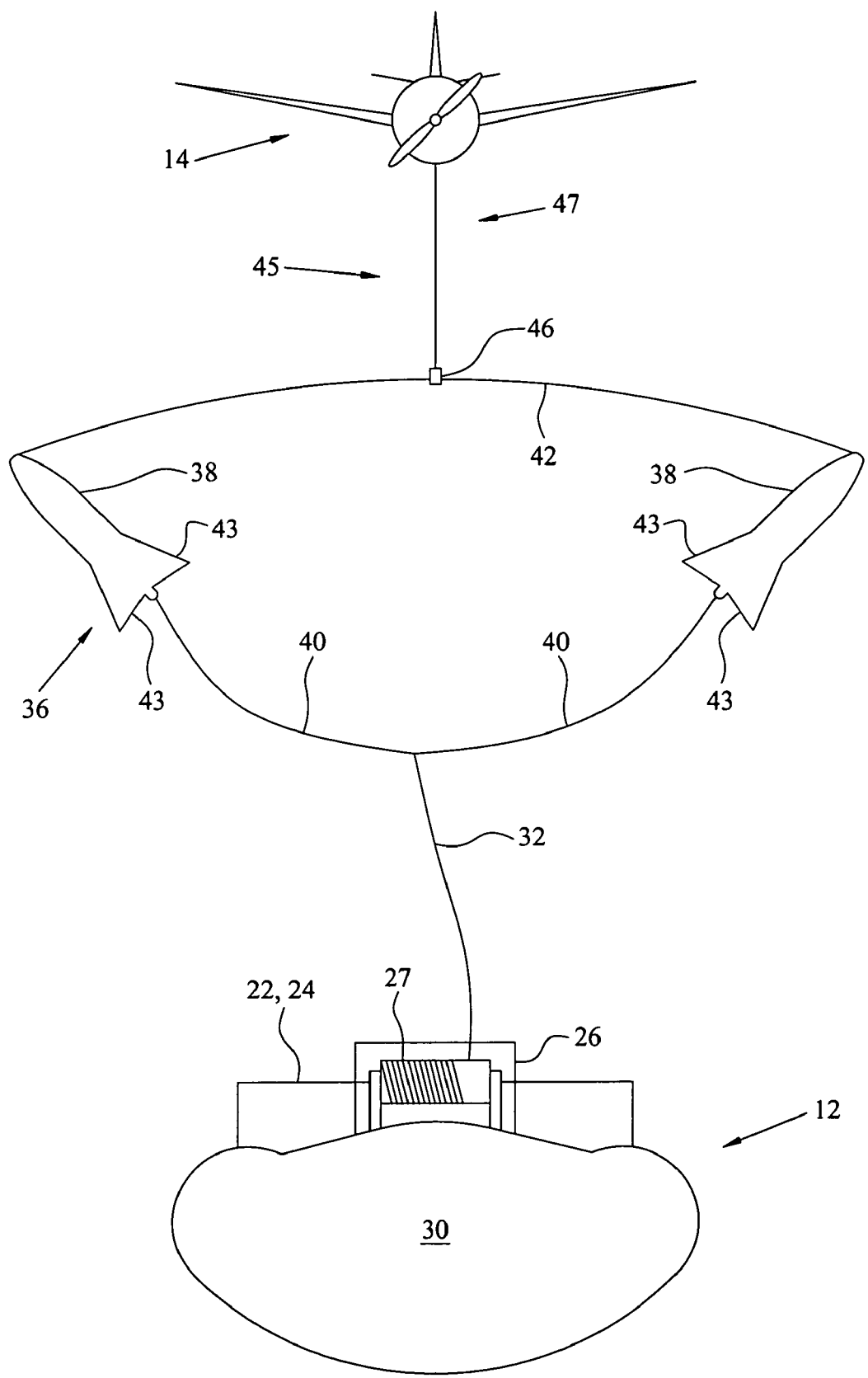
FIG. 3 is a schematic front view of a fixed wing UAV approaching from behind the USV as it speeds up and the lifting bodies are being reeled-out.
Figure 4:
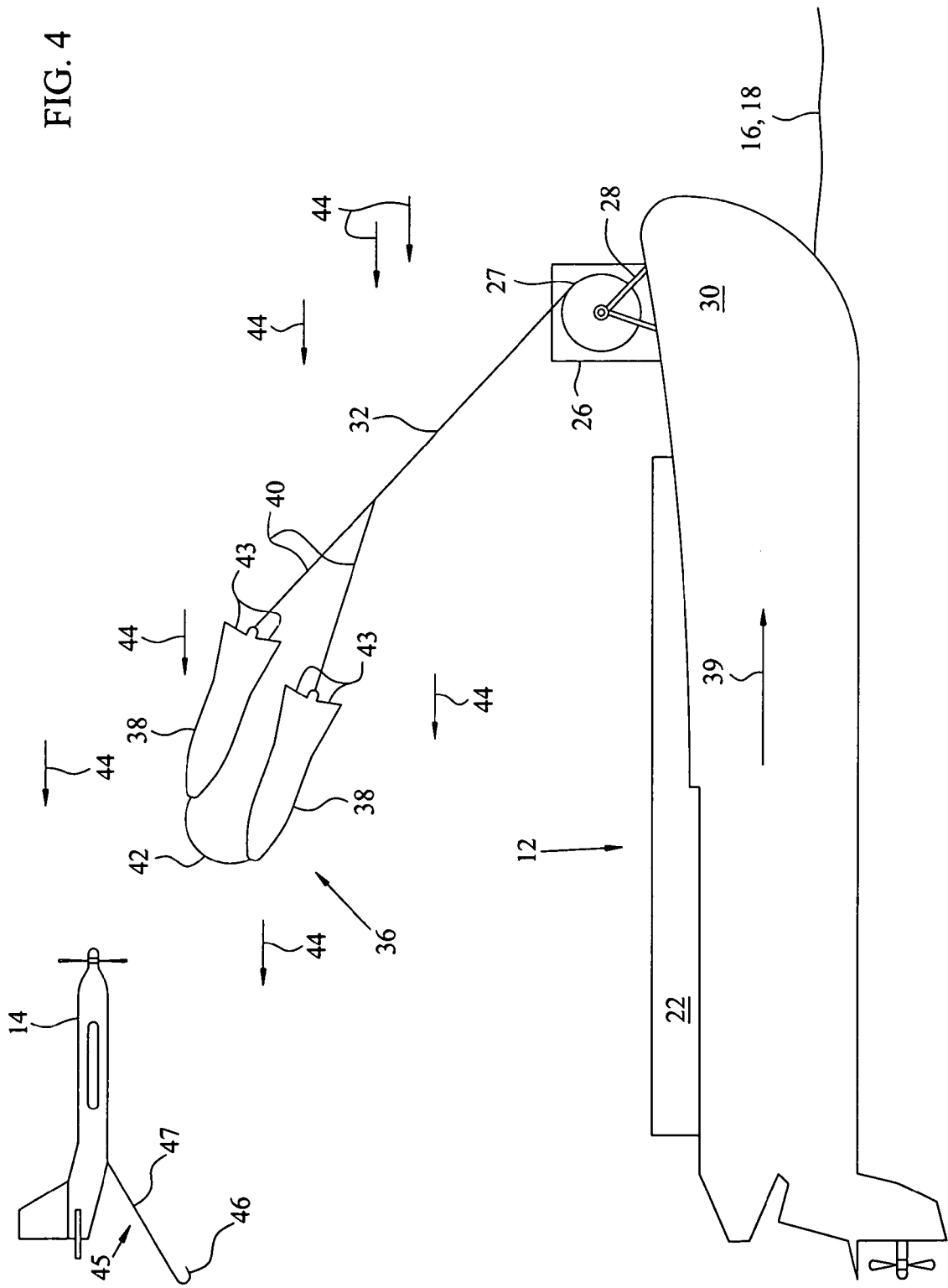
FIG. 4 is a schematic side view of FIG. 3 showing a fixed wing UAV approaching the USV from behind as it speeds up and lifting bodies are being reeled-out.

Referring also to FIGS. 3 and 4, USV 12 having lifting body assembly 36 aboard and secured as depicted in FIG. 2 nears the area where it will rendezvous for recovery of fixed wing UAV 14. USV 12 speeds up in the forward direction as shown by arrow 39, and distal end 34 of towline 32 is connected to branched tether 40 of lifting body assembly 36. Tether 40, lifting bodies 38, and snagging wire 42 of lifting body assembly 36 begin to be winched-out from winch 27. Lifting bodies 38 are driven in opposite lateral directions away from each other due to the aerodynamic forces imposed on fins 43 by airstream 44 as well as a possible aerodynamic reaction imposed by airstream 44 on the shapes of lifting bodies 38. Snagging wire 42 is stretched between the two lifting bodies 38 and keeps them a predetermined distance apart to serve as the target for connection by a snag or grabber hook mechanism 45.

Figure 11:
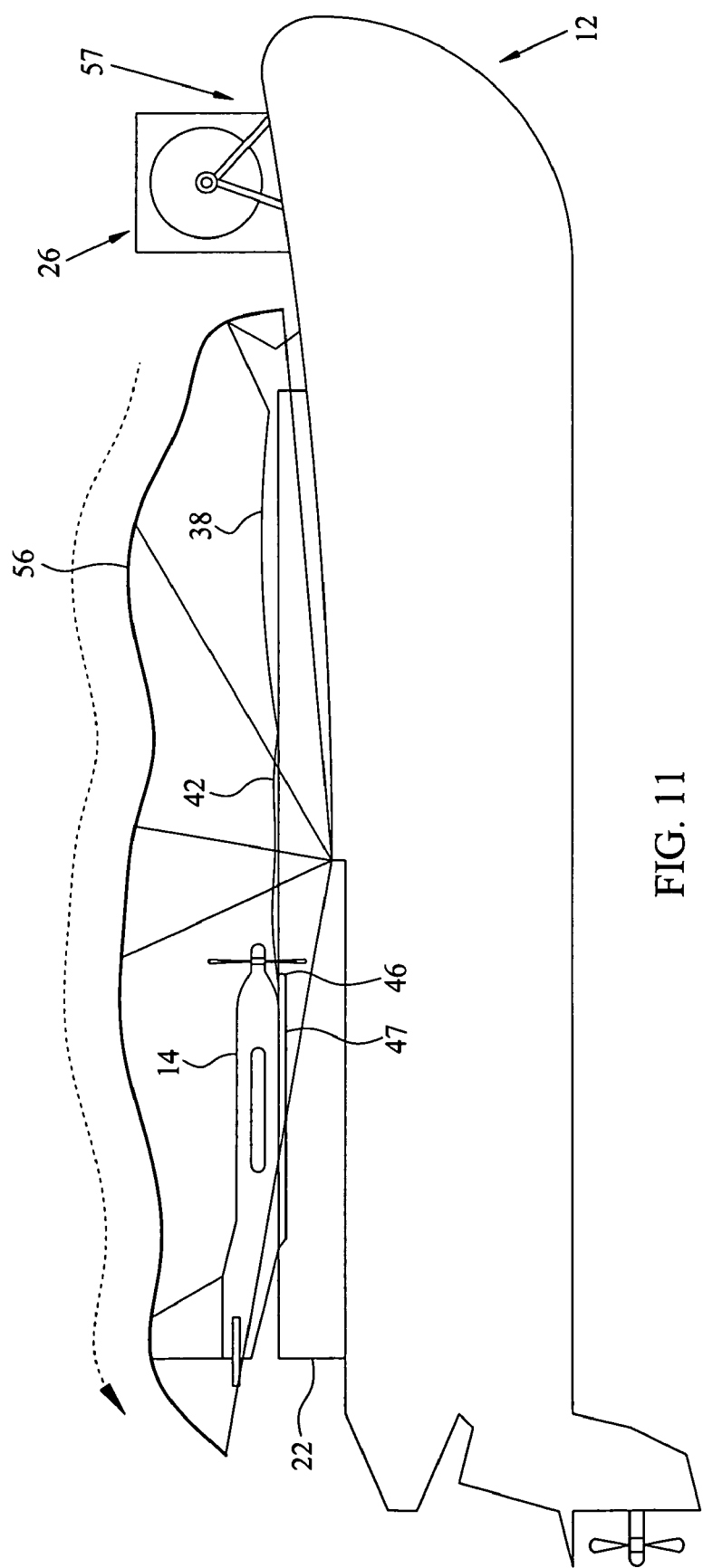
FIG. 11 is a schematic side view showing a powered inverse-convertible-top unfolding from the front portion of the USV and extending aft and over the entire landing pad and cradled UAV.

Grabber hook mechanism 45 has hook 46 at the lower end of a small boom 47 that is pivotally connected to UAV 14 at its opposite end so that it can hang down from and trail behind UAV 14. As UAV 14 flies through the air during a mission, hook 46 and boom 47 can be stowed to reduce air drag by extending forward or backward beneath the fuselage of UAV 14. An exemplary normally stowed position during flight is schematically shown in FIG. 11 where hook 46 and boom 47 are pivoted forward and stowed beneath UAV 14 while it rests on landing pad 22. Prior to engagement of snagging wire 42 by hook 46, boom 47 can be rotated aft from its stowed position. Then, boom 47 and hook 46 are free to pivot forward and aft beneath UAV 14 during engagement of wire 42 by hook 46.

Hook 46 will engage snagging wire 42 during recovery of UAV 14 by USV 12. This is because hook 46 is deep enough to receive and hold snagging wire 42 during the final approach and partial bypass of USV 12 by UAV 14 while both are traveling in the same direction. Snagging wire 42 can be any of a wide variety of load bearing members including metal wires and cables having sufficient strength, flexibility, and toughness to bear the loads created by lifting body assembly 36 and UAVs 14 during launch and recovery in extreme ambient conditions.

The addition and attachment of boom 47 and hook 46 and the associated release hardware of grabber hook mechanism 45 to UAV 14 are minor modifications that may be performed by one skilled in the art on a large number of fixed wing UAVs that are already available in inventory. Other than these minor modifications, propeller configuration or other UAV design parameters of the available UAVs are not critical to this concept since launch and recovery system 10 of the invention will work successfully with most UAV configurations.

Figure 5:
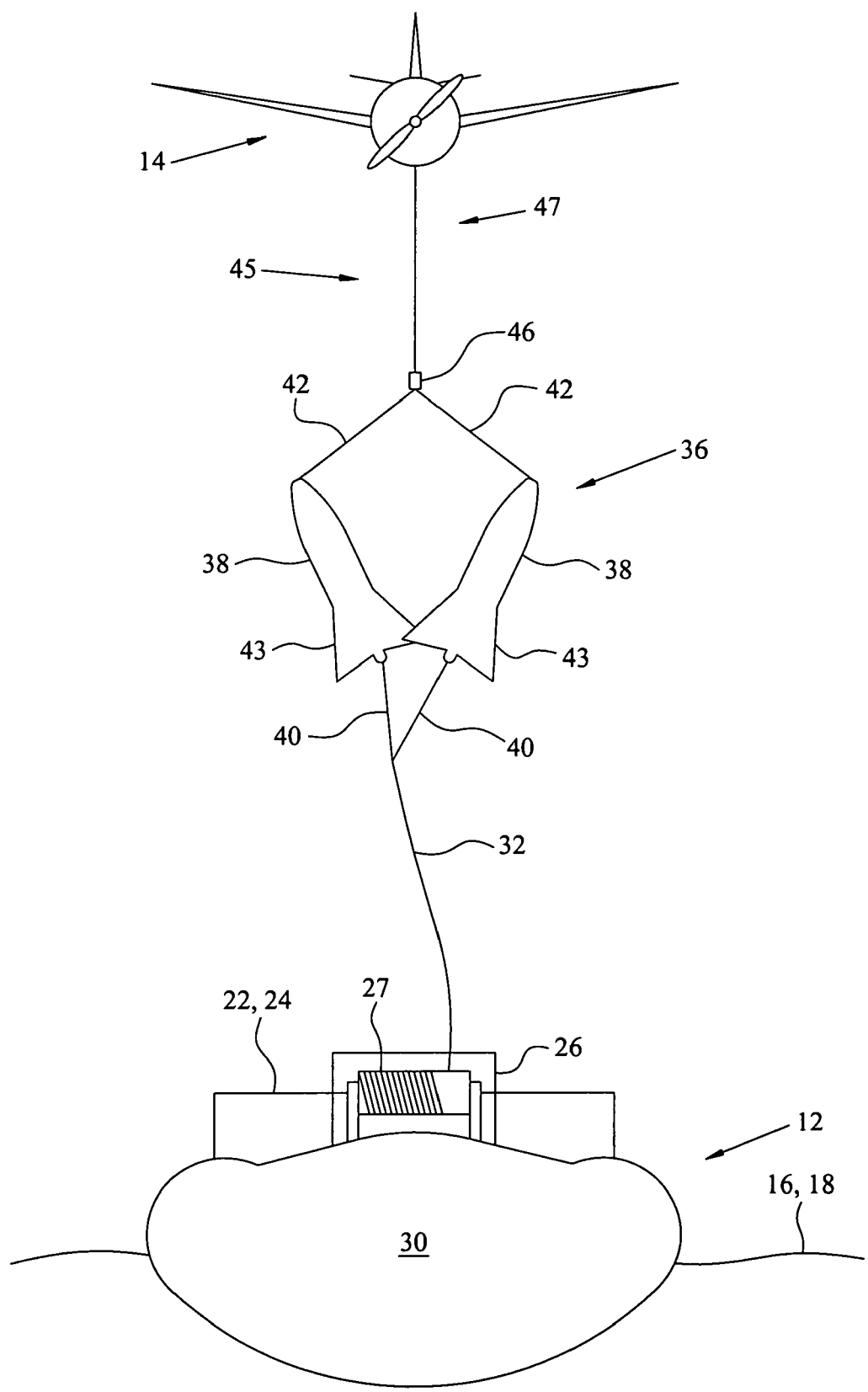
FIG. 5 is a schematic front view showing the UAV flying over the USV and the grabber hook mechanism engaging a snagging wire suspended between two lifting bodies and pulling them together as tension in the tow line changes.
Figure 6:
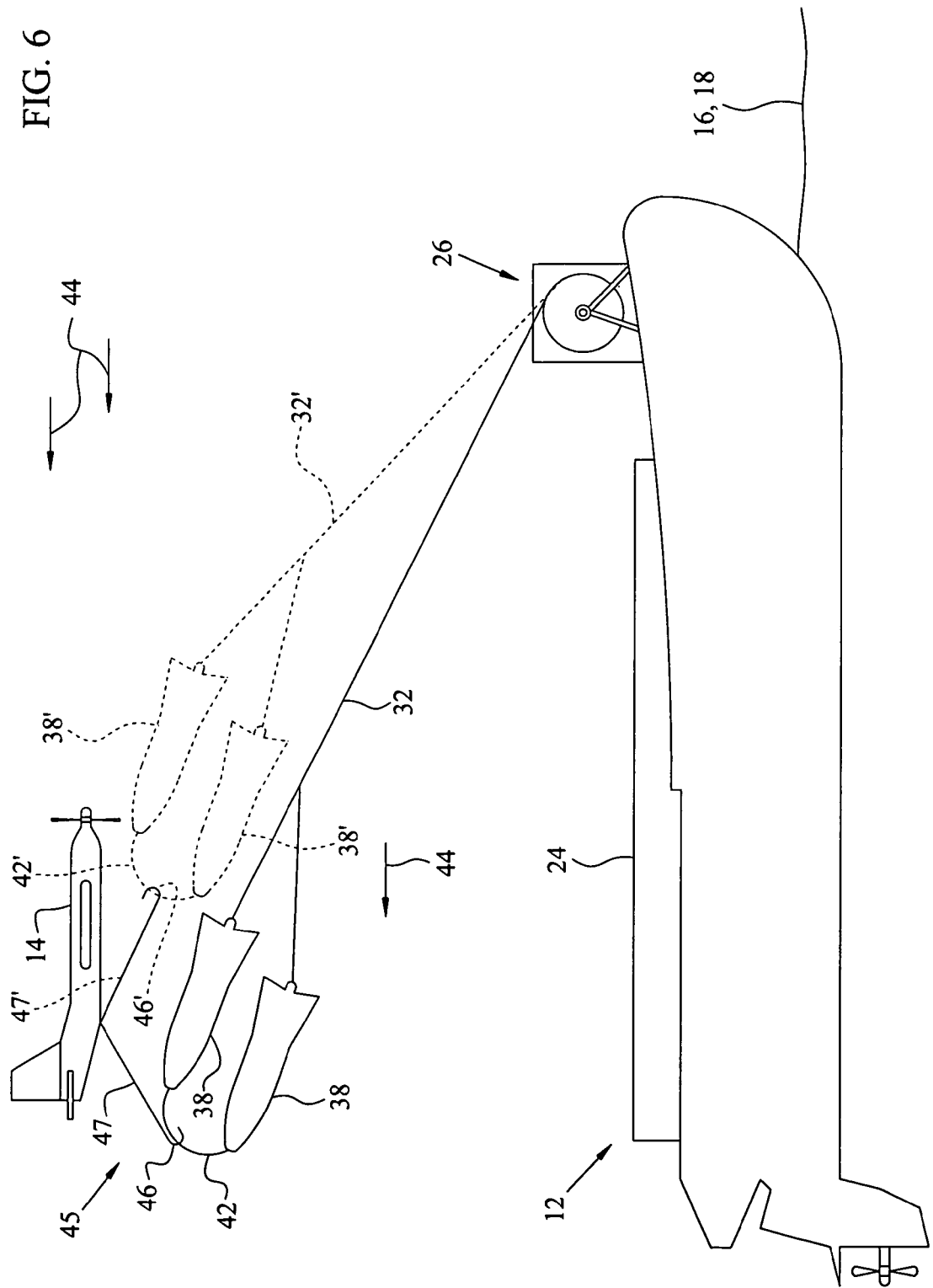
FIG. 6 is a schematic side view of FIG. 5.

Referring also to FIGS. 5 and 6, as UAV 14 approaches from the rear of USV 12 and flies forward over USV 12, hook 46 of grabber hook assembly 45 engages snagging wire 42 laterally suspended between lifting bodies 38. UAV 14 now is connected to snagging wire 42, and UAV 14 can slow or speed up relative to the velocity of USV 12. In either case, UAV 14 pulls the two lifting bodies 38 together to change the tension in towline 32. In other words, lifting bodies 38 snagged by UAV 14 via hook 46 and snagging wire 42 can move forward (as shown in phantom lifting bodies 38', snagging wire 42', and towline 32' engaging phantom hook and boom 46' and 47') or backward with respect to USV 12 as caused by relative motion of UAV 14 and USV 12. This is because grabber hook assembly 45 can be free to swivel or pivot backward or forward where hook 46 is mounted to boom 47 and where boom 47 is mounted at UAV 14. This pivotal coupling permits freedom of movement (or differences in velocity) between UAV 14 and USV 12. Consequently, any requirement for precise matching and control of the speeds of UAV 14 and USV 12 for successful snagging is minimized, or at least greatly reduced.

Figure 7:
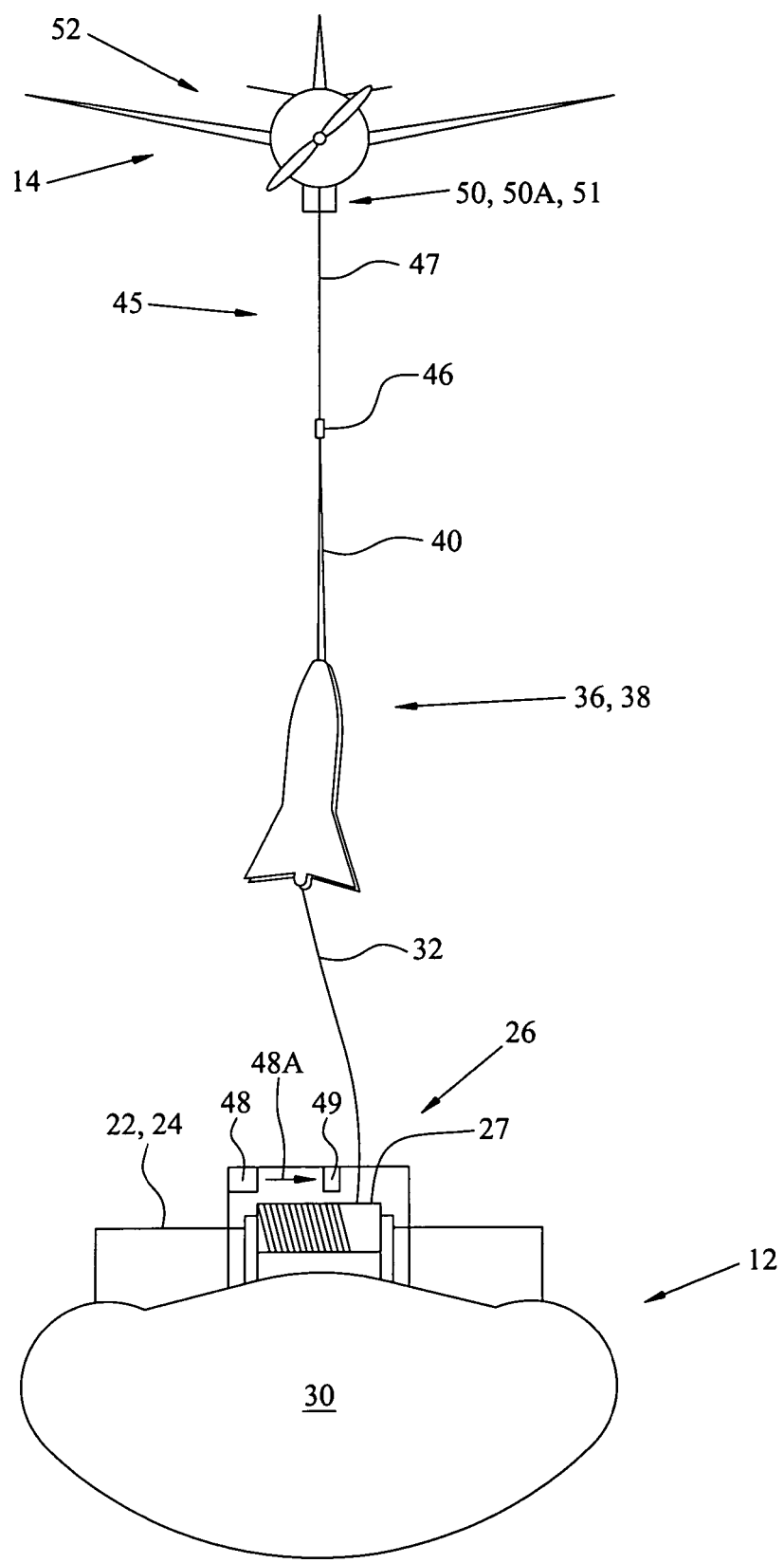
FIG. 7 is a schematic front view showing a change in towline tension causing the winch mechanism to start reeling in the UAV and tow it as a towed glider while the USV accelerates to a speed greater than the stall speed of the UAV.
Figure 8:
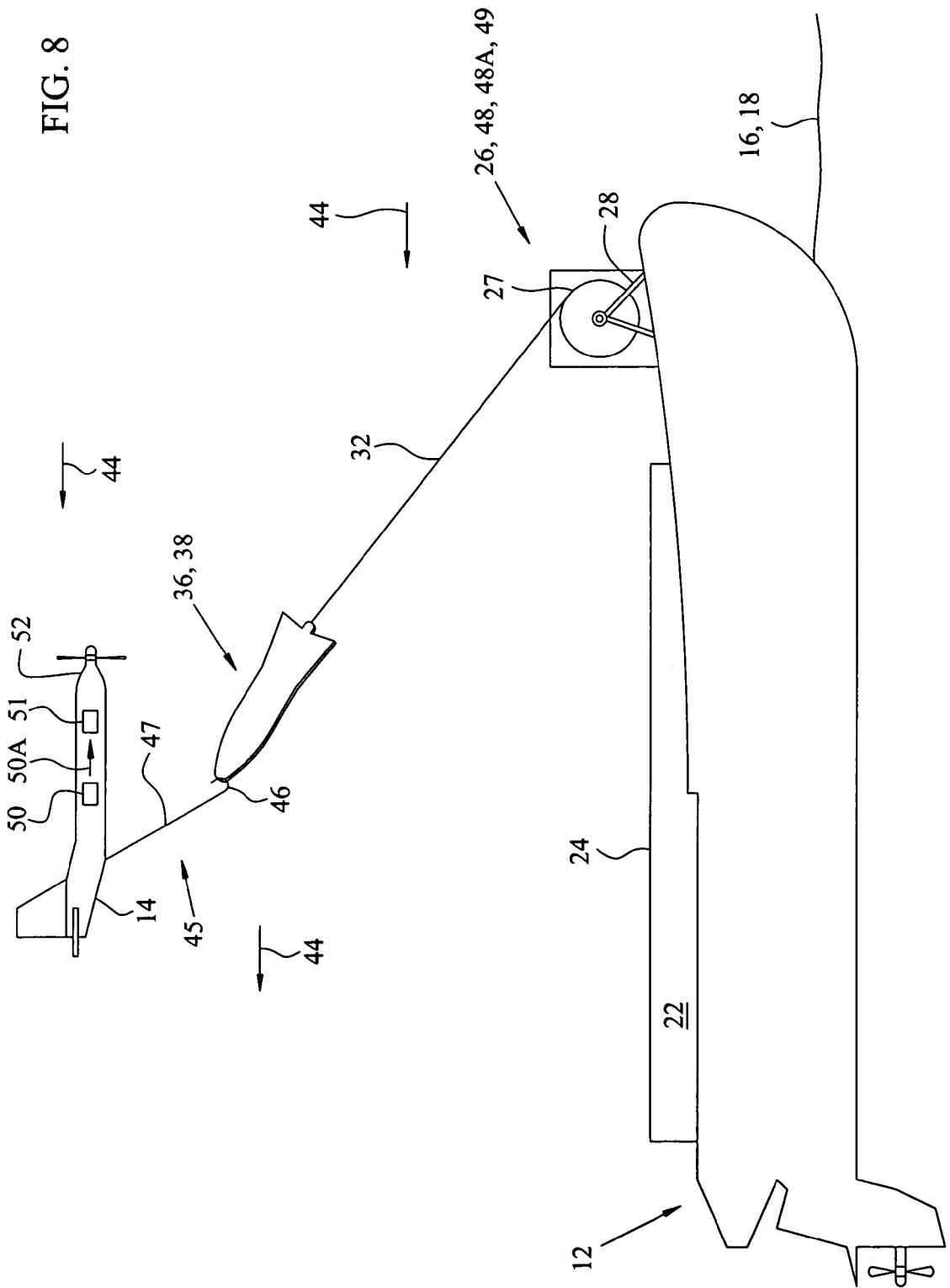
FIG. 8 is a schematic side view of FIG. 7 showing reeling in of the UAV toward the USV landing pad.

Referring also to FIGS. 7 and 8, a tension sensor 48 in winch module 26 on USV 12 senses a change in tension in towline 32 as hook 46 of grabber hook assembly 45 engages snagging wire 42. Tension sensor 48 generates a first representative signal 48A that is fed to a control computer 49 of winch module 26. Upon receipt of representative signals 48A, computer 49 activates winch 27 to start reeling in towline 32 and attached UAV 14. Simultaneously, computer 49 causes USV 12 to accelerate to a speed greater than the stall speed of UAV 14.

Virtually simultaneously, a tension sensor 50 in grabber hook mechanism 45 on UAV 14 senses a change in tension in boom 47 and/or hook 46 as hook 46 engages snagging wire 42. Tension sensor 50 generates a second representative signal shown as arrow 50A. Representative signal 50A, indicating a change in tension, is fed to a control computer 51 on UAV 14 that, among other things, controls the speed and operation of the engine 52 on UAV 14. Upon receipt of representative signal 50A, control computer 51 cuts the power of engine 52, and now UAV 14 operates as a glider being towed via towline 32 by USV 12, see FIGS. 7 and 8. USV 12 can further increase its speed as required to increase the tension in towline 32 and consequent airspeed of UAV 14 to maintain its flight stability. The increased tension in towline 32 will also cause lifting bodies 38 of lifting body assembly 36 to collapse together as USV 12 accelerates.

Winch 27 of winch module 26 continues to reel-in UAV 14 toward landing pad 22 on USV 12 and the forward speed of USV 12 and control surfaces on UAV 14 can be appropriately controlled during descent of UAV 14. These capabilities of launch and recovery system 10 of the invention maintain tension in towline 32 and allow UAV 14 to smoothly reach landing pad 22 through any turbulence that may exist above and near the stern of USV 12 and the surface 16 of water 18.

Figure 9:
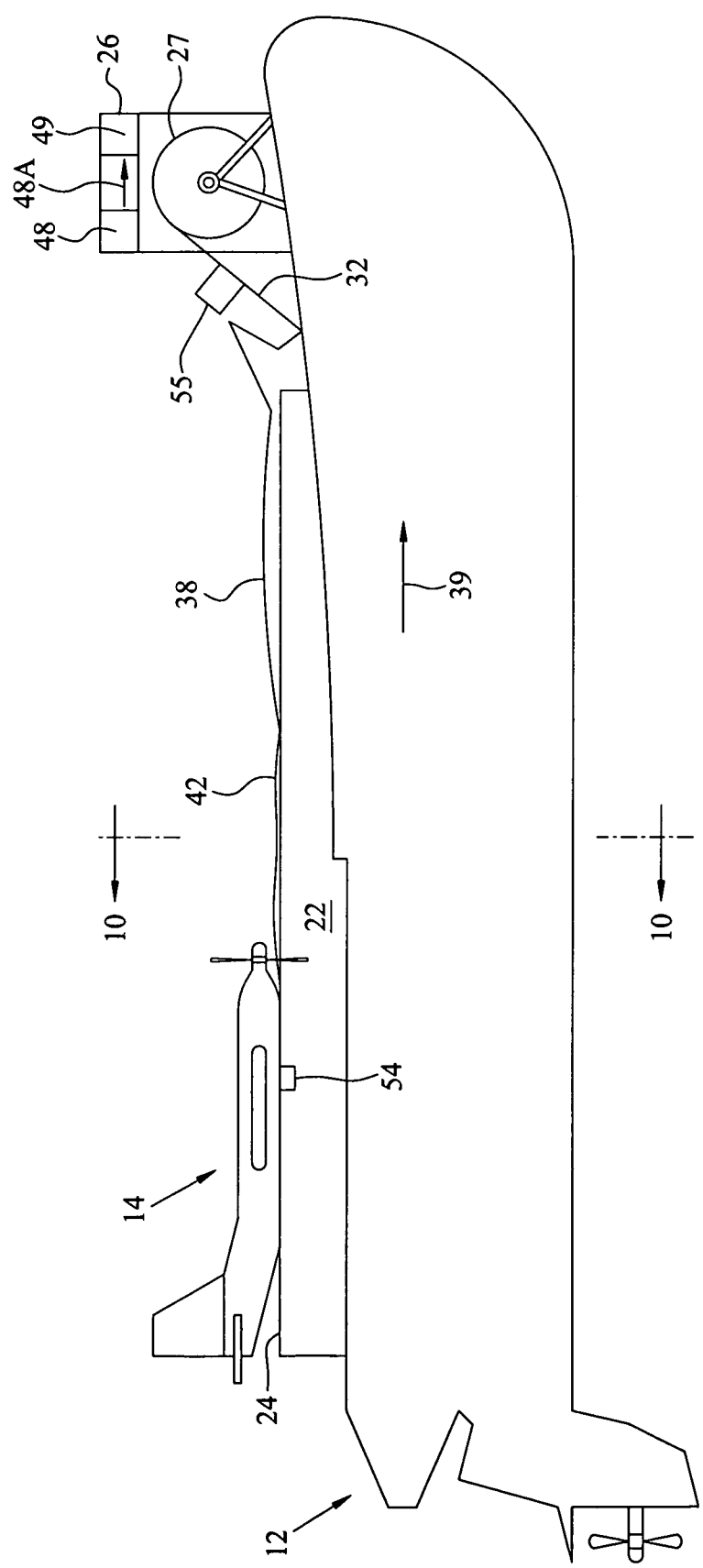
FIG. 9 is a schematic side view showing the UAV reeled-in to make contact with the landing pad.
Figure 10:
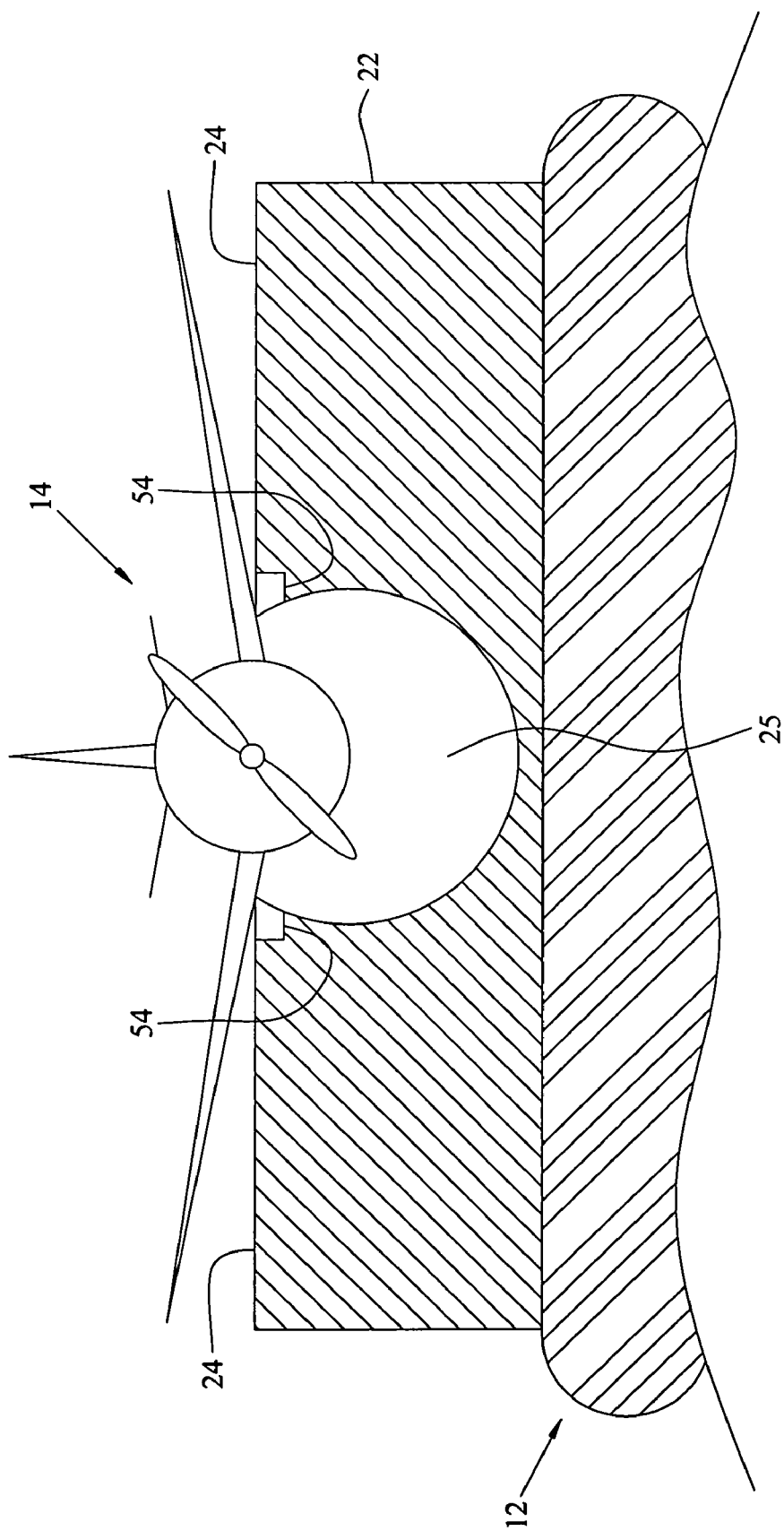
FIG. 10 is a cross-sectional view taken along line 10-10 in FIG. 9 showing wings in contact with landing pad surfaces and the stopped propeller cradled by a rounded channel in the landing pad.

Referring also to FIGS. 9 and 10, as UAV 14 is reeled to landing pad 22 and makes contact with landing pad surface 24, the lower half of its fuselage and the stopped propeller are cradled by rounded channel 25. Pressure sensors 54 in landing pad surface 24 and a limit switch 55 on winch module 26 cause winch 27 to stop further reeling-in of towline 32. UAV 14 now is at rest in channel 25 of landing pad 22. In addition, as soon as contact is sensed by pressure sensors 54 and/or limit switch 55 is activated, USV 12 can cut its forward speed below the stall speed of UAV 14 so that UAV 14 does not attempt to become airborne again.

Referring to FIG. 11, once on landing pad 22, a powered inverse convertible top 56 can be unfolded from the front portion 57 of USV 12. Top 56 can extend aft and over the entire landing pad 22 and cradled UAV 14. Top 56 is termed inverse because it operates in the opposite direction of a conventional automobile convertible top. The extended top 56 ensures that UAV 14 does not wash or fall overboard and also helps protect it from ambient wind, wave action, and sea spray.

Launch or takeoff of a newly installed or refueled/rearmed UAV 14 reverses the process described above. After top 56 Is retracted, USV 12 heads into the wind and/or increases speed to a velocity greater than the takeoff speed of UAV 14, and towline 32 starts to be reeled-out from winch 27. The generated airstream 44 over UAV 14 creates lift to make it airborne and rise behind USV 12 like a towed glider. At a predetermined altitude and speed, UAV 14 starts its motor 52 and begins to move forward relative to USV 12. Hook 47 of grabber hook mechanism 45 on UAV 14 can be equipped with a solenoid-powered release that, when appropriately activated via control computer 51, for example, can release hook 47 from snagging wire 42. Optionally, computer 51 could control boom 46 to rotate to the rear while UAV 14 descends slightly to disengage hook 47 from snagging wire 42. In either case, UAV 14 is free to fly off on its programmed mission. With UAV 14 gone, tension sensor 48 in winch module 26 on USV 12 senses a change in tension in towing line 32 and reels-in line 32 and lifting bodies 38, branched tether 40, and snagging wire 42 of lifting body assembly 36 to landing pad 22, and USV 12 can rapidly leave the area.

A noteworthy feature of launch and recovery system 10 of the invention is that UAV 14 does not have to be launched from USV 12, but instead can be launched directly from the deck of a conventional ship or other surface craft using currently known launch methods. In this manner, a ship could potentially carry multiple UAVs. The ship can use the services of the UAVs and then the UAVs can be recovered at other locations with one or more USVs using launch and recovery system 10 of the present invention.

The proposed launch and recovery system 10 of the invention allows fixed wing UAVs to be modified and used for maritime operations. This capability significantly increases the options for ship deployment and use of a large number of already available UAVs in inventory. An additional advantage is that launch and recovery system 10 of the invention allows the use of USVs for recovery of UAVs to free the host ship from having to restrict its operations and maneuvers for launch and recovery of UAVs. Launch and recovery system 10 of the invention significantly increases the flexibility and potential survivability of warships, and also gives significant operational flexibilities for commercial ships deploying UAVs and USVs.

The disclosed components and their arrangements as disclosed herein, all contribute to the novel features of this invention. Launch and recovery system 10 is a rugged, cost-effective, and uncomplicated means for assuring real-time launch and recovery of a wide variety of unmanned airborne platforms. Therefore, launch and recovery system 10 as disclosed herein is not to be construed as limiting, but rather is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. A system for launch and recovery of an aerial vehicle by a surface vehicle comprising:

a surface vehicle having a landing pad for an aerial vehicle, said surface vehicle being capable of generating a flowing stream of ambient air above it;

a winch module on said surface vehicle, said winch module comprising a winch, a towline coupled to said winch, and a sensor capable of sensing tension in said towline, wherein said winch is configured to selectively reel out and reel in said towline;

a lifting body assembly connected to said towline, said lifting body assembly having a pair of lifting bodies and a snagging wire, said lifting bodies being adapted to raise and lift said lifting body assembly, and said lifting bodies having fins configured to separate said lifting bodies in opposite lateral directions from each other and laterally extend said snagging wire between said lifting bodies when said lifting body assembly is exposed to said flowing stream;

a motor driven aerial vehicle for flying through the air; and a grabber hook mechanism coupled to said aerial vehicle, said grabber hook mechanism comprising a pivoted boom supporting a hook to engage said snagging wire.

2. The system of claim 1 further comprising:
a branched tether in said lifting body assembly being coupled to said lifting bodies and said towline.

3. The system of claim 2 wherein each lifting body of said lifting body assembly comprises an aerostat.

4. The system of claim 1 wherein said sensor of tension coupled to the towline generates a first signal representative of tension of said towline as said grabber hook mechanism engages said snagging line.

5. The system of claim 4 wherein said first representative signal causes said winch to reel in said towline and to bring said aerial vehicle to said landing pad of said surface vehicle.

6. The system of claim 5 further comprising:
a sensor of tension coupled to the grabber hook mechanism to generate a second signal representative of tension in said grabber hook mechanism as said grabber hook mechanism engages said snagging line.

7. The system of claim 6 wherein said second representative signal causes said aerial vehicle to cut its engine power and be towed by said towline like a glider.

8. The system of claim 7 further comprising:
a limit switch on said winch module, wherein said limit switch is configured to sense contact of said aerial vehicle on said landing pad and cause said winch to stop reeling in said towline.

9. The system of claim 8 wherein said limit switch is configured to reduce the forward speed of said surface vehicle below the stall speed of said aerial vehicle when said limit switch senses contact of said aerial vehicle on said landing pad.

10. The system of claim 7 further comprising:
pressure sensors in said landing pad, wherein said pressure sensors are configured to sense contact of said aerial vehicle on said landing pad and cause said winch to stop reeling in said towline.

11. The system of claim 10 wherein said pressure sensors are configured to reduce the forward speed of said surface vehicle below the stall speed of said aerial vehicle when said pressure sensors sense contact of said aerial vehicle on said landing pad.

12. A method of launching and recovering an aerial vehicle by a surface platform comprising the steps of:
generating a flowing stream of ambient air above the surface platform;
providing a landing pad on said surface platform;
connecting a lifting body assembly to a towline on a winch module on said surface platform, said lifting body assembly comprising a pair of lifting bodies, a snagging wire coupled to each said lifting body, and a branched tether coupled to each lifting body and said towline;
providing fins on each said lifting body to separate said lifting bodies in opposite lateral directions from each other and laterally extend said snagging wire therebetween;
selectively reeling out said towline from said winch module as said flowing stream lifts said lifting body assembly from said surface platform;
laterally extending said snagging wire between said lifting bodies;
flying a motor driven aerial vehicle through the air from behind to over said surface platform; and
engaging said snagging wire by a grabber hook mechanism coupled to said aerial vehicle, said grabber hook mechanism having a pivoted boom supporting a hook to engage said snagging wire.

13. The method of claim 12 further comprising the step of sensing tension in said towline by a sensor in said winch module.

14. The method of claim 13 further comprising the step of generating a first signal representative of tension in said towline by said winch module sensor of tension when said grabber hook mechanism engages said snagging line, said first signal causing said winch module to reel in said towline.

15. The method of claim 14 further comprising the steps of:
providing pressure sensors in said landing pad; and
stopping said step of reeling in said towline when said pressure sensors sense contact of said aerial vehicle on said landing pad.

16. The method of claim 14 further comprising the steps of:
providing a limit switch on said winch module;
stopping said step of reeling in said towline when said limit switch senses contact of said aerial vehicle on said landing pad.

17. The method of claim 14 further comprising the step of sensing tension in said grabber hook mechanism by a sensor in said grabber hook mechanism.

18. The method of claim 17 further comprising the step of generating a second signal representative of tension in said grabber hook mechanism by said grabber hook sensor of tension when said grabber hook mechanism engages said snagging line, said second signal causing said aerial vehicle to cut engine power.

* * * * *